Patented Nov. 1, 1927.

1,647,426

UNITED STATES PATENT OFFICE.

WILHELM WITTER, OF HALLE-ON-THE-SAALE, AND PAUL NEHRING, OF BRUNSWICK, GERMANY.

PROCESS FOR RECOVERING LEAD CHLORIDE.

No Drawing. Application filed April 20, 1927, Serial No. 185,351, and in Germany February 5, 1925.

This invention relates to a process for recovering valuable lead compounds from materials containing sulphate of lead.

In the treatment of sulphide ores containing lead and zinc, or of residues of such ores, it has been proposed to convert the sulphides by known means into sulphates and to heat the mixture thereby resulting with a saturated solution of sodium chloride about half an hour up to 100° C.; thereupon the hot solution was passed into a cooling vessel where a mixture of lead sulphate and lead chloride was separated, which mixture was submitted to a further metallurgical treatment.

In comparison with this (or any similar) known process our present invention has several essential advantages; above all it is to be stated that our invention allows of extracting from the material under treatment containing lead sulphate, in a far shorter time about twice to thrice the quantity of lead in the form of a pure lead compound (chloride).

This important technical progress is realized by treating the material containing lead sulphate with a suitably concentrated solution of sodium chloride (or other chlorides capable of reacting on lead sulphate in the same manner) under conditions of pressure above atmospheric and of temperatures above 100° C.

By way of example, the present invention may be carried out in practice in the following manner: Commercial lead sulphate (or any other material containing lead sulphate), if necessary or desired, after being cleaned from adhering soluble substances such as salts, free acid, etc., is agitated with a sufficient or equivalent quantity of a solution of sodium chloride (say of 25 per cent) under a pressure of about 4 to 5 atmospheres at a temperature of about 140 to 150° C. After the reaction is completed (say after 10 to 15 minutes), the mass is settled for a short time, whereupon the liquid containing lead is passed under pressure through a heated filter press.

By cooling the clear solution from the filter press, pure lead chloride will crystallize out. However, before such crystals separate, the lead content of the solution can be precipitated by any known means in metallic form or in form of another lead compound.

As mentioned above, this process can also be used for treating materials which do not contain lead in the form of sulphate, but in sulphide combination, such as, for instance, sulphide ores and their residues, in which case the sulphide is previously converted into sulphate.

It need not be mentioned that the conditions of pressure and temperature stated above by way of example can be varied in a wide range according to the material to be treated. As an essential feature our process provides the use of closed vessels wherein the material is treated at temperatures above 100° C. and under pressures above atmospheric with a suitable chloride solution.

What we claim is:

1. Process of recovering chloride of lead from materials containing lead sulphate which consists in treating the material with a chloride solution in a closed vessel at a temperature above 100° C.

2. Process of recovering chloride of lead from materials containing lead sulphate which consists in treating the material with a chloride solution under a pressure above atmospheric and at a temperature above 100° C., after the reaction being completed settling and filterpressing the liquid.

3. Process of recovering chloride of lead from materials containing lead sulphate which consists in treating the material with a concentrated solution of sodium chloride under a pressure of about 4 to 5 atmospheres at a temperature of about 140 to 150° C., settling and filterpressing the liquid.

In testimony whereof we have signed our names to this specification.

WILHELM WITTER.
PAUL NEHRING.